United States Patent Office 2,805,980
Patented Sept. 10, 1957

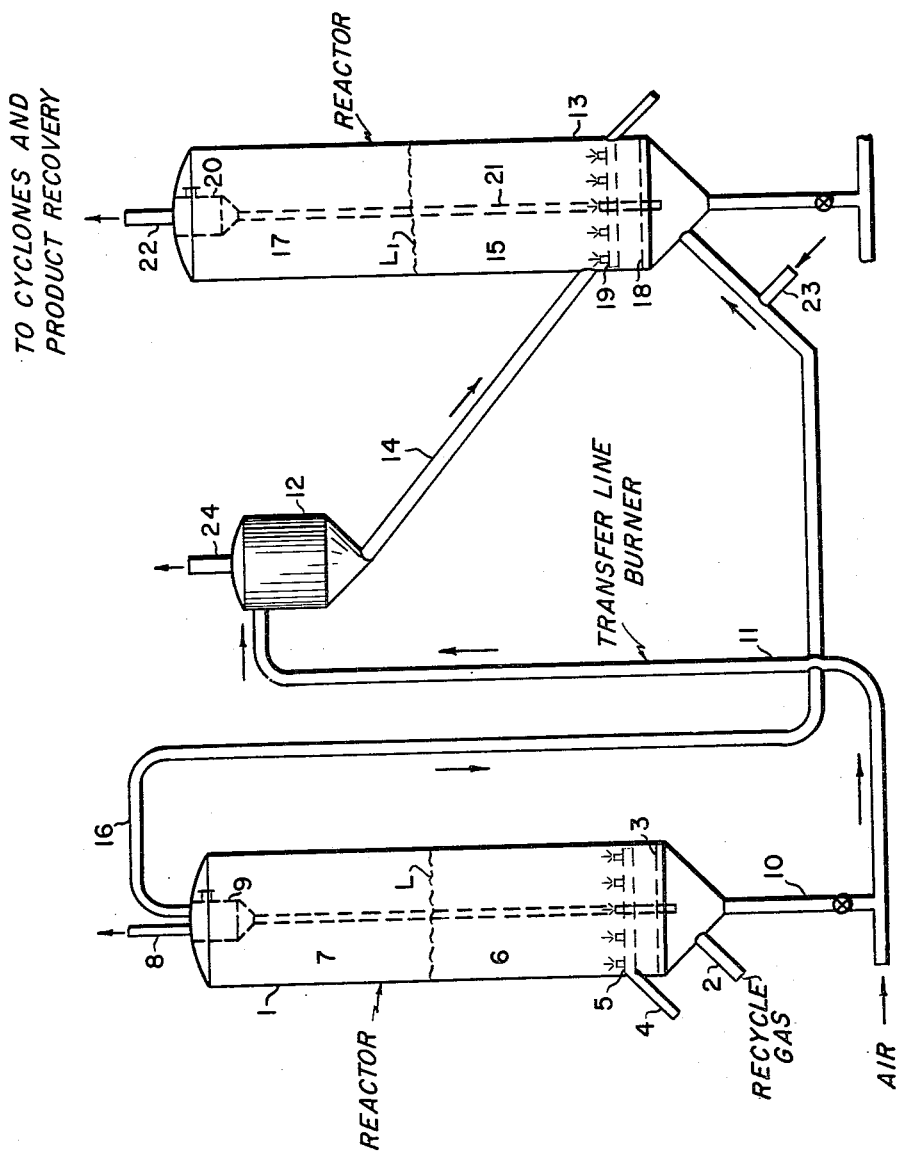

2,805,980

FLUID BATCH HYDROFORMING PROCESS

Donald D. MacLaren, Scotch Plains, N. J., assignor to Esso Research and Engineering Company, a corporation of Delaware Application September 4, 1953, Serial No. 378,639

5 Claims. (Cl. 196—49)

The present invention relates to improvements in the hydroforming of naphthas. More particularly, it relates to an improved fluid batch process utilizing noble metal catalysts.

Hydroforming is defined as an operation in which a petroleum naphtha is contacted at elevated temperatures and pressures and in the presence of a recycled hydrogen-containing gas with a solid catalytic material under conditions such that there is no net consumption of hydrogen.

Usually the feed stock boils substantially within the range of from about 150°–430° F. and more particularly 200°–350° F. The light ends, i. e., the material boiling from about 0°–200° F., are not subjected to this reaction because the virgin naphtha light ends already have a fairly good octane rating and cannot be substantially improved without suffering an undue loss in yield. The feed or charging stock to the hydroforming reactor can be a virgin naphtha, a cracked naphtha, a Fischer-Tropsch naphtha, a mixture of these, or the like.

Hydroforming operations are ordinarily carried out in the presence of hydrogen or hydrogen-rich recycle gas at temperatures of 750°–1150° F., in the pressure range of about 50 to 1000 pounds per square inch with a hydrogen dilution of from 100 to 10,000 C. F./B. Noble metal catalysts, especially platinum, have been finding increasing utility in these processes because of their high activity. This platinum catalyst is usually supported on a suitable base, such as alumina, and may also contain a small amount of promoters or stabilizers such as boria, phosphoric acid, silica, halides or organic acids. For instance, a commonly used composition of such catalyst is one containing from 0.01 to 2.0 weight usually about 0.5 weight percent platinum, the remainder being the alumina spacing agent or base. In place of alumina, other bases having mild cracking activity are used.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha having an octane number of about 50 to a hydroformate having an octane number of from 95 to 98 and obtain yields of $C_5+$ hydrocarbons as high as 85%.

It has been proposed in application Serial No. 188,236, filed October 3, 1950, now U. S. Patent 2,699,823, issued September 21, 1954, to effect the hydroforming of naphtha fractions in the presence of a dense fluidized catalyst mass in a fluidized solids reactor system in which naphtha vapors are passed continuously through the denser, fluidized bed of hydroforming catalyst particles in a reaction zone, spent catalyst particles being withdrawn continuously from the dense bed in the reaction zone and passed to a separate regeneration zone where fouling, deactivating carbonaceous deposits are removed by combustion, whereupon the regenerated catalyst particles are continuously returned to the main reactor vessel. Fluid hydroforming, as thus conducted, has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

In platinum catalytic processes, however, it is undesirable to regenerate more often than is absolutely necessary because the rate of activity decline during the feed portion of the cycle becomes faster. Thus while the catalyst is restored to initial activity and selectivity by each regeneration, each succeeding on feed cycle becomes shorter and shorter with each subsequent regeneration. Important factors in the latter, for example, are the increased size of the platinum crystals and the rate of platinum crystal growth.

In such cases it is undesirable to employ the conventional continuous fluid technique because of the frequency with which the catalyst is regenerated. Since activity and selectivity reflect the average age, fluid operation tends to give lower activity and selectivity than is normally obtained in fixed bed operation. However, it is highly desirable to be able to take advantage of the isothermal nature of the fluid system because of the adverse effect on activity maintenance of high inlet temperature encountered in fixed bed operation. One way of accomplishing this would be to have two-batch fluid units. One of the units is on regeneration while the other is on feed. In the case of fluid platinum reforming where the catalyst is very expensive, it is obviously undesirable, however, to provide an extra charge of catalyst.

This invention provides an improved process for combining the advantages of the isothermal fluid system in combination with the infrequent regenerations possible in batch operation. As explained in further detail below, two batch reaction vessels are provided with a transfer line burner in between. When it is time to regenerate, the catalyst is slowly withdrawn from one reactor vessel and passes through the transfer line burner where it is regenerated, carbon being removed, and then charged into the second vessel. While this transfer is being made, feed entering the first reactor is also passed through the second reactor. Thus, no loss in overall feed rate is incurred during the regeneration. It is thus possible to periodically regenerate the catalyst in this batch fluid system while providing only a single charge of catalyst.

This invention will be better understood by reference to the flow diagram shown in the drawing.

In the drawing, 1 is a reaction vessel provided near the bottom with an inlet line 2 for the introduction of hot hydrogen-rich recycle process gas. A portion of the recycle gas can also be sent directly into standpipe 10. A perforated plate or distributor grid 3 is arranged horizontally within the vessel for insuring uniform distribution of the incoming recycle gas over the entire cross section of the reactor vessel. A separate inlet line 4 connected to distributor grid 5 or the like is shown for the introduction of naphtha above the grid member 3, although the fresh feed may, if desired, be introduced separately or along with recycle gas below the grid. The reactor vessel 1 is charged with finely divided hydroforming catalyst particles, and the superficial velocity of the vapors and gases passing upwardly through the vessel is so controlled as to form a dense, fluidized, turbulent bed of catalyst 6 having a definite level L superposed by a dilute or disperse phase 7 comprising small amounts of catalyst contained in gaseous or vaporous reaction products. The reaction products are taken overhead from the reactor through line 8, through cyclone or cyclones 9 or the like for separating entrained catalyst particles which are returned to the dense bed 6 through the dip leg attached to the bottom of the cyclone separator. Reaction products are conducted via line 8 through suitable heat exchange equipment to fractionating, stabilizing and/or storage equipment not shown.

After the operation has been carried on for a certain period of time in the system just described, it becomes desirable to regenerate the catalyst to remove carbon, restore its activity and selectivity. When this becomes necessary, catalyst from dense bed 6 is withdrawn through the standpipe 10, where it is picked up by a stream of air and carried through the transfer line burner 11. Carbon is burned from the catalyst in the transfer line burner, a conduit of restricted cross section. The catalyst is in the form of a confined stream. Catalyst is separated from the regeneration gas in cyclone separator 12 and is subsequently fed to reactor vessel 13 through transfer line 14 where it forms a dense bed 15. Regenerator gas is withdrawn through line 24.

During this burning operation in order to prevent reduction of feed rate or cessation of reforming operation, overhead products including feed leaving reactor 1 are diverted from the normal product recovery facilities and are fed directly via line 16 to the bottom of reactor 13, where the remainder of the reforming operation is completed. In reactor 13 a dense, fluidized turbulent bed of catalyst 15 is formed similarly to the operation in reactor 1. The catalyst has a definite level L' superposed by a dilute or disperse phase 17. A perforated plate or distributor grid 18 is also arranged horizontally within reactor 13, as is a distributor 19. The superficial velocity of the vapors entering through line 16 is such as to form the dense, fluidized, turbulent bed of catalyst 15. Reactor 13 is thus designed similarly to reactor 1. The reaction products are taken overhead through a cyclone separator 20 where entrained catalyst particles are returned to the dense bed 15 through dip pipe 21. Reaction products are conducted via line 22 through suitable heat exchange equipment to fractionating, stabilizing and/or storage equipment not shown.

During regeneration of the catalyst in reactor 1 the level L in reactor 1 goes down as catalyst is withdrawn until eventually reactor 1 is empty. At this point the feed and recycle gas are no longer admitted to reactor 1, but are switched to reactor 13, the feed entering through distributor ring 19 and recycle gas through line 23. Operation according to the batch fluid technique then proceeds until it becomes necessary to regenerate again. At that point the reaction in reactor 13 exactly parallels the reaction operations that previously were conducted in reactor 1. Lines can be provided, as apparent to those skilled in the art, for conducting product from reactor 13 over to reactor 1 when it becomes necessary to regenerate again in a similar manner as already described for reactor 1.

The feed stock is preheated alone or in admixture with recycle gas to reaction temperature or to the maximum temperature possible while avoiding thermal degradation of the feed stock. Ordinarily preheating of the feed stock is carried out to temperatures of about 800°–1000° F., preferably about 950° F. The naphtha preheat should be as high as possible while avoiding thermal degradation thereof as by limiting the time of residence in the transfer or feed inlet lines. The preheated feed stock may be supplied to the reaction vessel in admixture with hydrogen-rich recycle gas, or it may be introduced separately as shown. The recycle gas, which contains from about 60 to 95 volume percent hydrogen, is preheated to temperatures of about 1150°–1200° F., prior to the introduction thereof into inlet line 2. The recycle gas should be circulated through the reactor at a rate of from about 100 to 10,000 cubic feet per barrel of naphtha feed. The amount of recycle gas added is preferably the minimum amount that will keep carbon formation at a satisfactory low level and supply the necessary heat of reaction over and above that supplied by other means such as heating coils, heated shot, etc.

The reactor system is charged with a mass of finely divided hydroforming catalyst particles. The noble metal catalysts for treatment in accordance with the present invention include platinum, palladium, gold, silver, iridium, rhodium, ruthenium, osmium, etc. These noble metals are generally associated and supported on a metal oxide and particularly an oxide of a metal in the left hand columns of groups III to VIII of the periodic table including particularly the oxides of silicon, aluminum, titanium, zirconium, hafnium, thorium, vanadium, tantalum, chromium, molybdenum, tungsten, uranium, manganese, zinc, cobalt, nickel, etc. It is understood that the catalyst can comprise two or more noble metals and/or two or more metal oxides. In still other cases one or more activating components may be included in the catalysts. Particularly suitable is the platinum on alumina catalyst.

As explained, the carbonaceous deposits are removed from the catalyst in a transfer line burner when regeneration becomes necessary. This is accomplished by adding air to the burner in admixture with sufficient recycled flue gas to control temperature in the range of 700°–1150° F., preferably about 1050° F. Residence time in the transfer line is in the order of 1 to 10 seconds or longer.

The catalyst particles are, for the most part, between 200 and 400 mesh in size, or about 0–200 microns in diameter, with a major proportion between 20 and 80 microns.

Space velocity or the weight in pounds of feed charged per hour per pound of catalyst in the reactor depends upon the age or activity level of the catalyst, the character of the feed stock, and the desired octane number of the product. Space velocity for a platinum on alumina catalyst may vary, for example, from about 1.5 wt./hr./wt. to about 0.15 wt./hr./wt. Space velocity also depends to a very large extent on the reactor temperature and recycle gas rate.

In order to explain the invention more fully, the following conditions of operation of the various components are set forth below and in the examples.

*Conditions in reactors 1 and 13*

|  | Preferred | Range |
|---|---|---|
| Catalyst composition | 0.5% Pt on Al$_2$O$_3$ | 0.01–2.0% Pt. |
| Temp., ° F | 850–950 | 750–1,150. |
| Pressure, p. s. i. g | 50–500 | 0–1,000. |
| Space rate, lbs. feed/lb. cat./hr | .5–10 | .1–20. |
| Cu. ft. of recycled gas fed/bbl. of oil. | 1,000–6,000 | 100–10,000. |
| Concentration of H$_2$ in recycle gas. | 80–90 | 60–95. |

*Conditions in transfer line regenerator 11*

|  | Preferred | Range |
|---|---|---|
| Temperature, ° F | 1,000–1,100 | 700–1,150 |
| Pressure, p. s. i. g | 50–500 | 0–1,000 |
| Residence time, seconds | 1–10 | 1–60 |
| Fluidizing gas velocity, ft./sec | 10–30 | 5–100 |

The advantages of this process will be apparent to those skilled in the art. The better features of isothermal fluid operation and batch procedure are utilized. Excessive catalyst requirements are avoided. This is especially significant in the case of noble metal catalysts wherein their high costs are a definite limitation on the process.

It is to be understood that this invention is not limited to the specific examples, which have been offered merely as illustrations, and that modifications may be made without departing from the spirit of this invention.

What is claimed is:

1. In a process for hydroforming hydrocarbons in contact with a dense, fluidized catalytic mass wherein the catalyst comprises a supported noble metal, the improvement which comprises the steps of periodically withdrawing carbonized catalyst particles from a dense fluidized bed of catalyst particles in a first hydroforming reaction zone, regenerating the withdrawn catalyst particles by treatment with an oxygen-containing gas at elevated temperatures while the catalyst particles are in the form of a confined stream, separating the regenerated catalyst particles from the regeneration gas, discharging the separated regenerated catalyst particles into a second hydroforming reaction zone, withdrawing product and feed vapors overhead from said first reaction zone and simultaneously with the said withdrawal and regeneration of the carbonized catalyst passing the vapors removed overhead from said first hydroforming zone into the bottom of said second hydroforming reaction zone, contacting the said vapors with a dense fluidized bed of said catalyst particles in said second hydroforming reaction zone for a period sufficient to complete the hydroforming reaction and withdrawing hydroformed products overhead from said second hydroforming reaction zone.

2. The process of claim 1 in which the regeneration step is carried out at a temperature in the range of 1000°–1100° F.

3. The process of claim 2 in which the time of the regeneration step is in the range of 1–10 seconds.

4. The process of claim 1 in which the catalyst is platinum on alumina.

5. The process of claim 4 in which the catalyst is 0.5 weight percent platinum on alumina.

References Cited in the file of this patent

UNITED STATES PATENTS

| | | |
|---|---|---|
| 2,430,245 | Payne | Nov. 4, 1947 |
| 2,479,110 | Haensel | Aug. 16, 1949 |
| 2,642,381 | Dickinson | June 16, 1953 |